US006483109B1

(12) United States Patent
Reinhold et al.

(10) Patent No.: US 6,483,109 B1
(45) Date of Patent: Nov. 19, 2002

(54) MULTIPLE STAGE MASS SPECTROMETER

(75) Inventors: Bruce B. Reinhold, Lee, NH (US); Anatoli N. Verentchikov, St. Petersburg (RU)

(73) Assignee: University of New Hampshire, Durham, NH (US)

( * ) Notice: Subject to any disclaimer, the term of this patent is extended or adjusted under 35 U.S.C. 154(b) by 72 days.

(21) Appl. No.: 09/648,643

(22) Filed: Aug. 25, 2000

Related U.S. Application Data

(60) Provisional application No. 60/150,874, filed on Aug. 26, 1999.

(51) Int. Cl.[7] .......................... B01D 59/44; H01J 49/00

(52) U.S. Cl. ........................ 250/292; 250/282; 250/287

(58) Field of Search ................................ 250/282, 287, 250/292

(56) References Cited

U.S. PATENT DOCUMENTS

| | | | | | |
|---|---|---|---|---|---|
| 4,328,420 | A | * | 5/1982 | French | 250/292 |
| 5,479,012 | A | * | 12/1995 | Wells | 250/292 |
| 5,763,878 | A | * | 6/1998 | Franzen | 250/292 |
| 5,811,800 | A | * | 9/1998 | Franzen et al. | 250/292 |
| 5,847,386 | A | * | 12/1998 | Thomson et al. | 250/292 |
| 6,020,586 | A | * | 2/2000 | Dresch et al. | 250/287 |
| 6,093,929 | A | * | 7/2000 | Javahery et al. | 250/292 |
| 6,204,500 | B1 | * | 3/2001 | Whitehouse et al. | 250/287 |
| 6,323,482 | B1 | * | 11/2001 | Clemmer et al. | 250/287 |

OTHER PUBLICATIONS

Lambert, C.M. et al., "Multistep Tandem Mass Spectrometry for Sequencing Cyclic Peptides in an Ion–Trap Mass Spectrometer", Journal of American Society for Mass Spectrometry, 1999, 10, 732–746.

Lin, T. et al., "C–Terminal Peptide Sequencing via Multistage Mass Spectrometry", Analytical Chemistry, vol. 70, No. 24, Dec. 15, 1998.

Solouki, T. et al., "Electrospray Ionization and Matrix–Assisted Laser Desorption/Ionization Fourier Transform Ion Cyclotron Resonance Mass Spectrometry of Permethylated Oligosaccharides", Analytical Chemistry, vol. 70, No. 5, Mar. 1, 1998.

Hager, James W., "Performance Optimization and Fringing Field Modifications of a 24–mm Long RF–only Quadrupole Mass Spectrometer", Rapid Communications in Mass Spectrometry, 13, 740–748 (1999).

Kornienko, P.T. et al., "Micro Ion Trap Mass Spectrometry", Rapid Communications in Mass Spectrometry, 13, 50–53 (1999).

Ji, Q. et al., "A Segmented Ring, Cylindrical Ion Trap Source for Time–of–Flight Mass Spectrometry", Journal of American Societry for Mass Spectrometry, 1996, 7, 1009–1017.

* cited by examiner

*Primary Examiner*—Bruce Anderson
(74) *Attorney, Agent, or Firm*—Andrew T. Karnakis

(57) ABSTRACT

A highly sensitive multiple stage (MS$^n$) mass spectrometer is disclosed, capable of eliminating losses of ions during the isolation stage. Ions of interest are isolated (by m/z value) without rejecting ions of other m/z values, permitting the selected ions to be dissociated, while the rest of the ion population is available for subsequent isolation, dissociation and analysis of fragment ions. One preferred instrument includes a pulsed ion source coupled with a linear array of mass selective ion trap devices, at least one trap being coupled to an external ion detector. Each ion trap is configured with a storing cell for ion trapping interspersed between a pair of guarding cells, all aligned along their z axis. Radio frequency (RF) and direct current (DC) voltages are applied to electrodes of the ion trap device to retain ions within the storing cells. Each trapping cell has a sub-region in which the dynamical motion of the ion exhibits m/z-dependent resonance frequencies along the z direction, allowing the ion motion to be selectively excited by m/z value. The AC voltages can be combined with time-resolved changes in the applied DC voltages to enable individual trapping cell to be switched between ion trapping, mass selecting and ion fragmenting modes. Ions may be selectively transferred between ions traps, and selectively dissociated within each trap to enable a higher sensitivity MS$^n$ operation. Various ion trapping devices are disclosed, namely, harmonic linear traps, Paul traps, and quadrupole traps.

24 Claims, 6 Drawing Sheets

MULTIPLE STAGE MASS SPECTROMETER

This application claims priority on U.S. Provisional Application No. 60/150,874, filed on Aug. 26, 1999.

FIELD OF THE INVENTION

The invention generally relates to mass spectrometers and specifically to tandem mass spectrometers. More specifically the invention is directed to a mass spectrometry apparatus and method that provides an effective solution for multiple stage mass spectrometric analysis and coupling of low resolution multiple stage mass spectrometry devices with external high-resolution mass spectrometers.

BACKGROUND OF THE INVENTION

Traditionally tandem mass spectrometers (MS-MS) have been employed to provide structural information for samples of interest. In MS-MS instruments, a first mass spectrometer is used to select a primary ion of interest, for example, a molecular ion of a particular biomolecular compound such as a peptide, and that ion is caused to fragment by increasing its internal energy, for example, by colliding the ion with a neutral molecule. A second mass spectrometer then analyzes the spectrum of fragment ions, and often the structure of the primary ion can be determined by interpreting the fragmentation pattern. The MS-MS instrument improves the recognition of a compound with a known pattern of fragmentation and also improves specificity of detection in complex mixtures, where different components give overlapping peaks in simple MS. In the majority of applications the detection limit is defined by the level of chemical noise. Drug metabolism studies and protein recognition in proteome studies are good examples. Frequently, MS-MS techniques can also improve the detection limit. When analyzing certain samples it is often desirable to conduct further analyses of fragments produced from the originally selected ion, and such further analyses consist of repeated sequences of mass to charge ratio (m/z) isolation and fragmentation. In some cases different m/z fragments derived from a single parent ion are further analyzed, and in other cases a single m/z fragment is subjected to a succession of "n" mass spectrometric steps to yield relevant information regarding the original parent ion. This continued mass spectrometric analyses is referred to in the art as $MS^n$ analyses. Various types of mass spectrometers have been employed to conduct $MS^n$ analysis as discussed below.

A three-dimensional ion trap (3-D IT) is one of the most flexible devices for MS-MS and multi-step ($MS^n$) analysis. This trap is composed of a ring electrode and two end cap electrodes of special shape to create a quadrupolar distribution of potential. Radio frequency (RF) and DC offset electric potentials are applied between electrodes and cause ions to oscillate within the trap. By appropriately selecting voltage parameters, ions of a specific mass/charge ratio can be made to have stable or unstable trajectories. In another implementation an additional (auxiliary) AC voltage is applied to the end-caps to induce resonant excitation of selected ions either for the purpose of ejecting the selected ions or for the purpose of inducing collisional dissociation.

The 3-D ion trap is capable of single step mass spectrometric analysis. In such analysis ions are injected into the trap (or generated within the trap), confined to the center of trap because of low energy collisions with an inert gas such as helium (typically at 1 mtorr pressure) and then sequentially ejected through the apertures in the end cap electrodes onto an external detector by raising the amplitude of the RF field. The same device could be used for a multi-step, i.e. $MS^n$ , analysis. The ion trap isolates ions in a m/z window by rejecting other components, then fragments these isolated ions by AC excitation, then isolates resulting ion fragments in a m/z window and repeats such sequence ($MS^n$ operation) in a single cell. At the end of the sequence ions are resonantly ejected to acquire the mass spectrum of N-th generation fragments. The 3-D IT is vulnerable to sensitivity losses due to ion rejection and instability losses at the time of ion selection and fragmentation.

Fourier transform ion cyclotron resonance mass spectrometry (FTMS) currently provides the most accurate measurement of ion mass to charge ratios with a demonstrated resolution in excess of 100,000. In FTMS, ions are either injected from outside the cell or created inside the cell and confined in the cell by a combination of static magnetic and electric fields (Penning trap). The static magnetic and electric field define the mass dependent frequency of cyclotron motion. This motion is excited by an oscillating electric potential. After a short period the applied field is turned off. Amplifying and recording weak voltages induced on the cell plates by the ion's motion detects the frequency of ion motion and, thus, the m/z of the ion. Ions are selectively isolated or dissociated by varying the magnitude and frequency of the applied transverse RF electric potential and the background neutral gas pressure. Repeated sequences of ion isolation and fragmentation ($MS^n$ operation) can be performed in a single cell. An FIMS is a "bulky" device occupying a large footprint and is also expensive due to the costs of the magnetic field. Moreover, an FTMS exhibits poor ion retention in $MS^n$ operation (relative to the 3-D ion trap).

Currently, the most common form of tandem mass spectrometer is a triple quadrupole, where both mass spectrometers are quadrupoles and an RF only quadrupole functions as a collisional cell to enhance ion transport. Because of low scanning speed the instrument employs continuous ion sources like ESI and atmospheric pressure chemical ionization (APCI). Since scanning the second mass spectrometer would cause losses, the most effective way of using this instrument is monitoring of selected reactions. Drug metabolism studies are a good example where a known drug compound is measured in a rich biological matrix, like blood or urine. In those studies both parent and daughter fragment masses are known and the spectrometer is tuned on those specific masses. For more generic applications requiring scanning, the triple quadrupole instrument is a poor instrument choice because of its low speed, sensitivity, mass accuracy and resolution.

Recently hybrid instruments combining quadrupoles with time of flight analyzers (Q-TOF) have been described where the second quadrupole mass spectrometer is replaced by an orthogonal time of flight spectrometer (o-TOF). The o-TOF back end allows observation of all fragment ions at once and the acquisition of secondary spectra at high resolution and mass accuracy. In cases where the full mass range of daughter ions is required, for example, for peptide sequencing, the Q-TOF strongly surpasses the performance of the triple quadrupole. However, the Q-TOF suffers a 10 to a 100 fold loss in sensitivity as compared to a single quadrupole mass filter operating in selected reaction monitoring mode (monitoring single m/z). For the same reason the sensitivity of the Q-TOF is lower in the mode of "parent scan" where, again, the second MS is used to monitor a single m/z.

More recently, the quadrupole has been replaced by a linear ion trap (LIT). The quadrupole with electrostatic "plugs" is capable of trapping ions for long periods of time. The quadrupole field structure allows one to apply an arsenal of separation and excitation methods, developed in 3-D ion trap technology, combined with easy introduction and ejection of the ion beam out of the LIT. The LIT eliminates ion losses at selection and also can operate at poor vacuum conditions which reduces requirements on the pumping system. However, a limited resolution of ion selection, R<200, has been demonstrated thus far.

All of the existing $MS^n$ devices suffer from a common drawback in that they do not provide a capability for storing results of multiple MS steps with the concomitant capability to explore multiple branches of fragmentation using the same ion material. The current state of the art is that the sequence of functional steps (selection, cooling, fragmentation and analysis) is done either "in-time" while keeping results in the same cell, as in ion trap and FTMS devices, or "in-space" with the ion beam constantly flowing, as in triple quadrupole, Q-TOF and LIT-TOF devices. In both cases selection of ions of interest automatically means rejection of all other components. As a result the existing instruments limit the number of multi-step MS analysis that can be carried out simply due to ion losses. It would therefore be desirable to improve the sensitivity of $MS^n$ analysis and thus provide a capability of detailed sequencing and analysis of ultra low quantity sample in complex matrixes. It would also be desirable to produce a device with multiple cells for storing the results of each step of the $MS^n$ analysis and thereby provide a device with a high efficiency of selection and fragmentation.

SUMMARY OF THE INVENTION

The present invention overcomes the disadvantages and limitations of the prior art by providing a highly sensitive multiple stage ($MS^n$ ) mass spectrometer and mass spectrometric method, capable of eliminating losses of ions during the isolation stage. Ions of interest are physically isolated (by m/z value) without rejecting ions of other m/z values, so that the selected ions may be dissociated, while the rest of the ion population is available for subsequent isolation, dissociation and mass spectrometric analysis of fragment ions.

A preferred embodiment of the invention includes a pulsed ion source coupled with a linear array of mass selective ion trap devices at least one of the traps being coupled to an external ion detector. Each ion trap device is configured with a storing cell for ion trapping interspersed between a pair of guarding cells, all aligned along a common axis, denoted in the following as the z direction (FIG. 1). A combination of radio frequency (RF) and direct current (DC) voltages are applied to electrodes of the ion trap device to retain ions within the trapping (storing) cells. Each trapping cell has a sub-region in which the dynamical motion of the ion exhibits resonance frequencies along the z direction. These resonance frequencies are m/z-dependent so that the ion motion can be selectively excited by m/z value through the application of AC voltages to various electrodes of the ion trap device. The AC voltages can be combined with time-resolved changes in the applied DC voltages so that each individual trapping cell can be switched between ion trapping, mass selecting and ion fragmenting modes. Ions may be selectively transferred between traps of said linear array, and selectively dissociated within each trap of said linear array to enable a higher sensitivity $MS^n$ operation. The application of the RF, AC and DC voltages and the resulting modes of operation of the invention depend on specific embodiments of the general concept as will be described in detail below.

The present invention is applicable to all currently useful methods of ion generation. In one preferred embodiment the pulsed ion source comprises an intrinsically pulsed (MALDI) ion source. In another preferred embodiment the pulsed ion source comprises an electrospray (ESI) or an atmospheric pressure chemical ionization (APCI) ion source with a storing multipole guide (for example, an accumulating quadrupole), periodically injecting ions into the array of ion traps.

In accordance with embodiments of the invention, the final mass analysis of fragments of the $n^{th}$ generation of fragmentation can be done either by mass dependent ejection of ions from the last (i.e., furthest from the ion source) ion trap within the array of ion trap devices onto a detector or by introducing the entire ion content of any cell into an external mass spectrometer of conventional design. In one particular embodiment, the external mass spectrometer is a time-of-flight mass spectrometer (TOF MS). In a preferred case of this embodiment, ions are pulsed injected into an orthogonal TOF MS with a synchronized orthogonal pulsing to reduce so-called "duty-cycle" losses. In yet another particular case of the embodiment, the last cell of the linear ion trap serves as an acceleration stage for the TOF MS.

In yet another embodiment, the mass spectrum of ions and/or fragments is acquired by measuring the weak electric signal induced by ion oscillations on the confining electrodes that are part of the ion trap cells.

In accordance with the invention, each ion trapping device with the linear array of ion trapping devices can be generally classified by the nature of the linear approximation to the ion trapping field in the center of the device (the 'origin'). An ion trapping field of a certain linear approximation can be realized by multiple electrode geometries and applied AC and DC signals. In one preferred embodiment, the linear approximation to the ion trapping field generates a harmonic linear trap (HLT) device. In another preferred embodiment, the linear approximation to the ion trapping field generates a Paul trap device.

The origin of the HLT or Paul trap device is the point inside the trapping region where the electric field for trapping a single ion vanishes. In the vicinity of the origin for the HLT or Paul trap the equations of motion for a single ion can be approximated by a linear set of three 2$^{nd}$ order, ordinary differential equations of motion. The HLT class covers three-dimensional ion traps in which a harmonic oscillator equation governs one coordinate (by convention, the z coordinate) and Mathieu equations govern the x and y coordinates. The Paul trap class has Mathieu equations governing all three coordinates.

In a preferred embodiment, the HLT device is configured as a triplet of electrode cells. Each cell triplet consists of open parallelpiped cells surrounding an open parallelpiped trapping cell. In the linear array, a guarding cell is shared between adjacent HLT triplets. The guarding and storing cells are distinguished by length, DC offset, z excitation voltages (dipolar) and function. In this embodiment the gate and trapping cells share the radial trapping RF voltage.

In yet another preferred embodiment, for the purpose of achieving a higher resolution of mass selection, each cell of the linear array is a Paul trap. The basic electrode geometry for the Paul trap could be the same as the HLT discussed above or can be constructed using hollow cylinder cells interspersed between guarding plate electrodes. In each instance, unlike the HLT, the RF is applied only to the trapping (storing) cells. A DC voltage is applied to both trapping and guarding cells and an AC signal (for exciting the z motion of the ions) is applied between the guarding and trapping cells.

A method of multiple step mass spectrometric analysis according to the present invention includes pulsed introduction of an ion beam into one of a plurality of multiple communicating ion traps, combined with novel features including a) sampling of ions into the adjacent trap without losses of other components, b) storing ion fragments of each generation in individual traps, and c) using stored ions for subsequent analysis of multiple fragmentation channels. Sampling a portion of the ions into an external mass spectrometer allows the extensive use of economic data-dependent algorithms in the selective transfer and dissociation of ions in the device.

In accordance with a preferred embodiment, the method of selective ion transfer between trapping cells involves an array of either HLT or Paul trap devices and further involves applying an AC signal between the guarding and storing cells (dipolar field local to the origin) with a single frequency equal to the resonant frequency of the ion's z motion. In one particular case of the embodiment, the applied AC signal has a time-dependent frequency that tracks the frequency shift in the ion's resonant z motion due to nonlinear electric fields perturbing the ion's motion away from the origin.

In an array of HLT the selective transfer method can be improved by lowering the DC barrier between ion traps once the ions of a predetermined m/z value are AC excited to the highest energy within the ion population in the trap. It is advantageous to drop the DC barrier at a predetermined phase of ion oscillation.

One aspect of the above-described methods of selective ion transfer is that non-transferred ions are retained within the ion trap for subsequent analysis. This is in contrast to conventional selection methods, where ions are isolated by the ejection of other components.

A method of ion fragmentation in accordance with one embodiment of the present invention is accomplished by accelerating ions between cells either by using a DC electric field between cells or by resonant AC excitation of ions. Contrary to fragmentation within a Paul trap, the ion fragmentation in the HLT array is characterized by minimal ion losses due to the greater stability of ion motion in the radial direction.

BRIEF DESCRIPTION OF THE DRAWING FIGURES

DETAILED DESCRIPTION OF THE INVENTION

Figure 1:
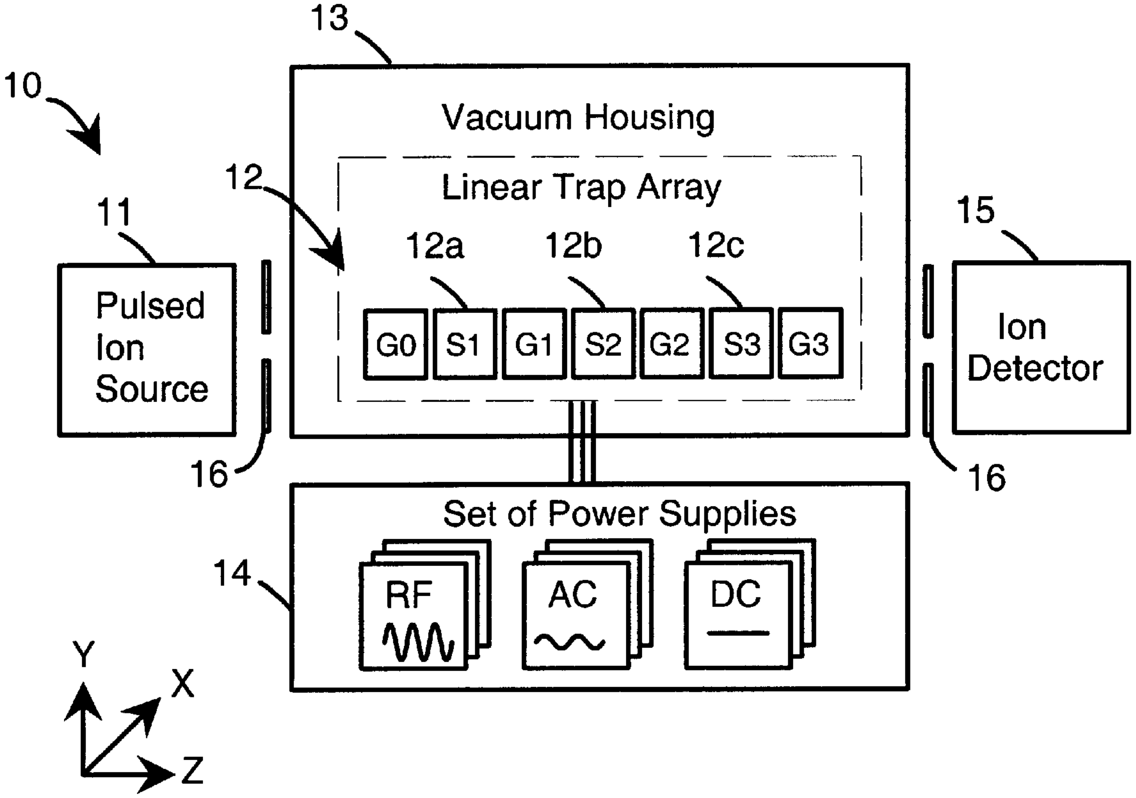
FIG. 1 is a block-diagram of an embodiment of the invention.

Referring to FIG. 1, in brief overview, a tandem mass spectrometer 10 of the present invention includes a pulsed ion source 11, an array of ion traps 12, composed of a linear array of communicating open cells, vacuum housing 13, a set of power supplies 14, and an external ion detector 15. The first cell 60 of the array is in communication with the pulsed ion source 11 and the last cell 63 with the detector. The array is enclosed in the vacuum housing at an intermediate vacuum for example, between $10^{-4}$ and $10^{-6}$ torr. Power supplies of the set 14 are electrically connected to individual electrodes of the array cells and produce RF, DC and AC signals. The linear array illustrated is composed of three mass resolving traps composed by storing cells 51, 52, 53 interspersed between guarding cells 60, 61, 62, 63. Lenses and/or conductance limits cap the entrance and exit of the array 16.

In operation, the pulsed ion source 11 ionizes the sample and fills the first cell of the array with the mixture of ions, which define a single ion packet. Ions are trapped and collisionally cooled in the cell 12*a* at an intermediate gas pressure (e.g., $10^{-4}$ torr). A combination of radio-frequency (RF), direct current (DC) and alternating current (AC) potentials is generated by the set of power supplies 14 and applied to individual electrodes of the cells that make up the array. Application of a DC potential difference between storing cells and guarding cells creates an effective barrier separating ions trapped in the storing cells. Adjustment of this barrier coupled with excitation of the ions to create axial (z) motion allow ions to be transported through the array of traps as will be explained in more detail below. Depending on the applied voltages, each cell 12*a,b,c*) becomes an individual ion trap with capabilities of ion fragmentation, storing, collisional cooling, and passing ions to adjacent cells and into the detector. As will be described in detail below, a feature of the invention, shown with respect to several embodiments, allows sampling of ions from one ion trap into another without discarding the rest of the ions that compose the original ion packet. This feature enables a highly sensitive "branched MS/MS" method to be carried out in which the isolation/fragmentation sequence for a particular sampled ion packet may be extended.

Figure 2:
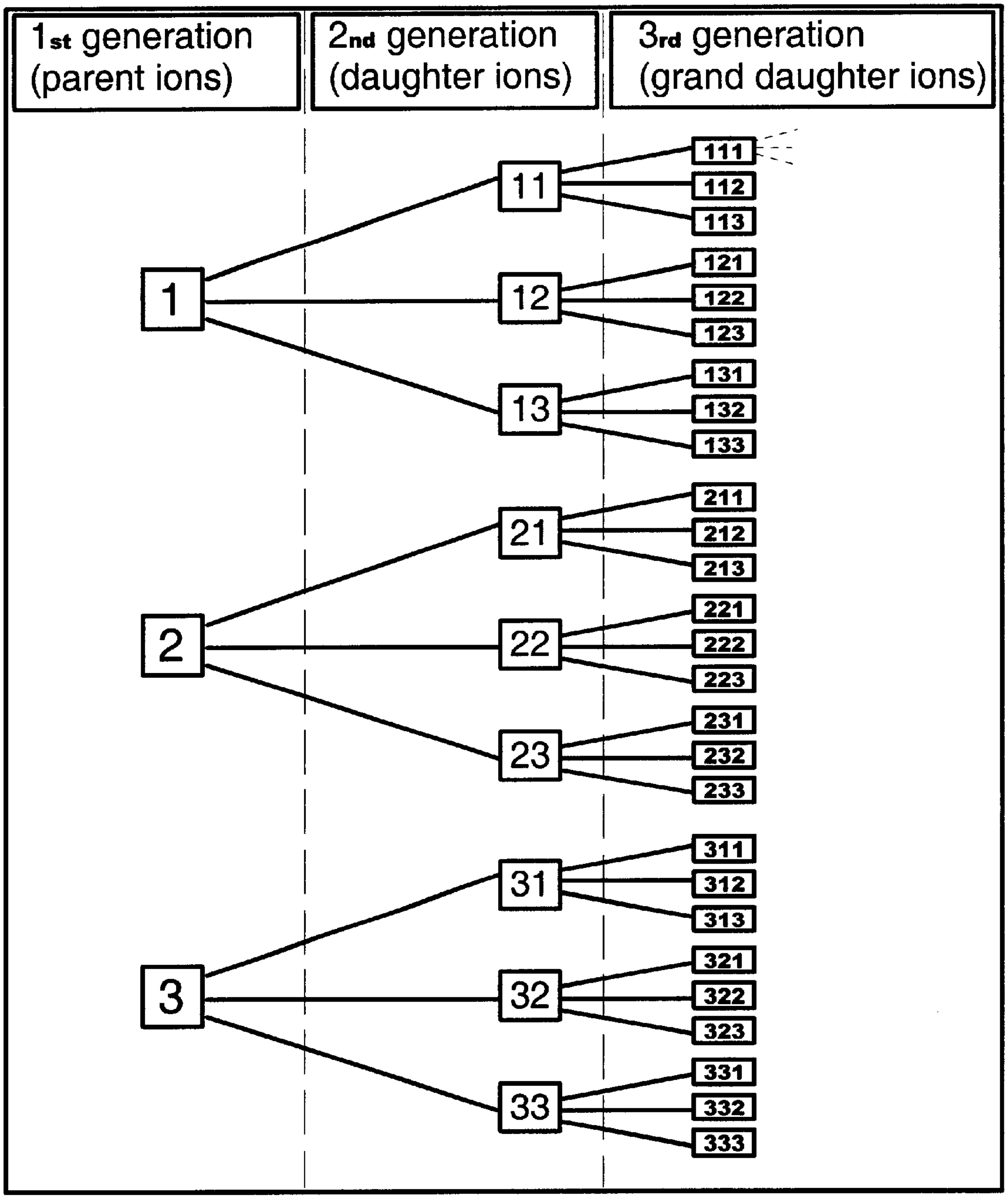
FIG. 2 is a flow chart of fragmentation channels, illustrating the concept of "branched $MS^n$" analysis.

Referring to FIG. 2, a "branched $MS^3$" method that would be enabled by the mass spectrometer of FIG. 1 is illustrated using a flow chart showing all the possible fragmentation channels for a hypothetical mixture of three molecular ions. The primary mixture represents the first generation of ions, annotated by numbers (1), (2) and (3), and shown in the first column. Dissociation products of these ions ($MS^2$) are shown in the next column and connecting lines show the relation between parent and product ions. Here it is assumed (for simplicity) each molecular ion generates three fragments. Numbers also track the relation between parent and product ions, e.g., two fragments of ion (1) are annotated as (11) and (12). The second generation of fragments may also undergo fragmentation to produce ions of the third generation ($MS^3$ ). The fragments of ion (11) are shown as a mixture of (111), (112) and (113). The chart shows the "genealogy" of three generations and tracks channels of individual ion formation. In practice, it is possible that multiple members of the fragment ions forming the chart will be chemically identical; however, since they are formed via different fragmentation channels isolating and analyzing each separately will yield additional useful analytical information. The method can be extended by adding extra cells and all subsequent (higher order $MS^n$) generations of fragments can be similarly tracked by adding to the annotation of digits.

TABLE 1

| Step Name | Ion types in cell 12a | Ion types in cell 12b | Ion types in cell 12c | |
|---|---|---|---|---|
| 1. Ion injection | 1, 2, 3 | 0 | 0 | |
| 2. Partial non selective a to b | 1, 2, 3 | 1, 2, 3 | 0 | |
| 3. Nonselective b to c | 1, 2, 3 | 0 | 1, 2, 3 | |
| 4. Eject/mass analyze c | 1, 2, 3 | 0 | 0 | (→$MS^1$) |
| 5. Selective a to b | 2, 3 | 1 | 0 | |
| 6. Fragmentation in b | 2, 3 | 11, 12, 13 | 0 | |
| 7. Partial non selective b to c | 2, 3 | 11, 12, 13 | 11, 12, 13 | |
| 8. Eject/mass analyze c | 2, 3 | 11, 12, 13 | 0 | (→$MS^2$) |
| 9. Selective b to c | 2, 3 | 12, 13 | 11 | |
| 10. Fragmentation in c | 2, 3 | 12, 13 | 111, 112, 113 | |
| 11. Eject/mass analyze c | 2, 3 | 12, 13 | 0 | (→$MS^3$ of ion 1 starts) |
| 12. Selective b to c | 2, 3 | 13 | 12 | |
| 13. Fragmentation in c | 2, 3 | 13 | 121, 122, 123 | |
| 14. Eject/mass analyze c | 2, 3 | 13 | 0 | (→$MS^3$ of ion 1) |
| 15. Selective b to c | 2, 3 | 0 | 13 | |
| 16. Fragmentation in c | 2, 3 | 0 | 131, 132, 133 | |
| 17. Eject/mass analyze c | 2, 3 | 0 | 0 | (→$MS^3$ of ion 1 ends) |
| steps 5–17 for ion 2 | 3 | 2 | 0 | |
| steps 5–17 for ion 3 | 0 | 3 | 0 | |

Table 1 shows an example of ion manipulation and storage in the array of FIG. 1 for a complete $MS^3$ analysis of a single ion species from an ion packet composed of ion species 1, 2 and 3. The table explicitly illustrates only the steps for the full $MS^3$ analysis of ion 1; the analysis of 2 and 3 would be identical except for different excitation frequencies (corresponding to different m/z values) used for selective transfer and fragmentation. The mixture of ions 1, 2, 3 is initially injected into the first storing cell 12*a*. In the second step part of the ion packet is non-selectively transferred to the next cell 12*b*. In the third step, the ion mixture is then non-selectively transferred to the last cell 12*c*, and in the fourth step the ion content of the last cell is ejected and mass analyzed, providing information corresponding to an $MS^1$ analysis. The details of such mass analysis will be described subsequently. The cycle of the first four steps permits determination of the masses of primary ions. In step 5, ion 1 of a predetermined mass is selectively transferred from cell 12*a* to cell 12*b*. In step 6, the ion species 1 in 12*b* is fragmented, for example, by applying a selective AC excitation. Alternatively, steps 5 and 6 can be combined if ions are accelerated by a sufficient DC offset between cells 12*a* and 12*b*. The masses of ion fragments are characterized in steps 7 and 8. The small portion of ion content of the cell 12*b* is moved to the last cell 12*c* and subsequently mass analyzed, thus providing information corresponding to an $MS^2$ analysis. The $MS^3$ analysis starts with steps 9, 10 and 11 in which the fragment 11 in cell 12*b* is mass-selectively transferred to cell 12*c* where it is dissociated and the fragments 111, 112 and 113 are ejected and mass analyzed. Then in steps 12, 13 and 14, the fragment 12 is subjected to an $MS^3$ analysis by mass-selective transfer from cell 12*b* to 12*c* where it is dissociated and the fragments 121, 122 and 123 are ejected and mass analyzed. Then in steps 15, 16 and 17, the fragment 13 in cell 12*b* is mass-selectively transferred to cell 12*c* where it is dissociated and the fragments 131, 132 and 133 are ejected and mass analyzed, thus completing the $MS^3$ analysis of ion 1. It is likely that ions of the sampled m/z value will not be removed completely in the steps of selective sampling. The ions remaining in cell 12*b* can then be ejected and mass analyzed in order to improve the signal to noise ratio of the $MS^2$ analysis previously conducted in step 8. The same protocol could then be applied to the remainder of ion species 1 in trap 12*a* or ion species 2 and 3 in 12*a*. The protocol described allows unambiguous identification of the m/z of the parent ion of a fragment even if all the ions of a particular m/z ratio are not selectively transferred. It remains important, however, that non-selective transfer, e.g., in the ejection for mass analysis, be complete.

Sampling a small portion of any trapping cell's content into an external mass spectrometer will allow the use of economic data dependent algorithms, in which information about fragment masses is known before the subsequent steps of selective ion sampling. For example, the ion fragments identified in the $MS^2$ spectrum of the initial samplings of the parent ion could be flagged for $MS^3$ analysis in subsequent samplings. In each of the subsequent samplings, after the known $MS^2$ fragments are transferred to 12*c* and $MS^3$ analyzed, residual $MS^2$ fragments in 12*b* can be ejected and mass measured to improve the $MS^2$ dynamic range. At a later point, the $MS^2$ ion fragments identified after multiple samplings of ions of a given species could then be added to the $MS^3$ list.

The branched MS/MS analysis can be used to follow all the channels of fragmentation of a particular ion using all of the ion material initially injected into the trap to thereby improve sensitivity and selectivity of $MS^n$ analysis, or, if desired, the first ion sampled can be fragmented and mass analyzed and then the second ion (still resident in the first storing cell) can likewise be sampled and analyzed, and so on and so forth. The versatility and power of the branched MS/MS method can thus be appreciated.

The embodiment of FIG. 1 is thus configured and operates to select particular parent ion(s) of interest, to fragment the ions of interest, to detect the resultant product ions, and then repeat the selection/fragmentation/detection processes a number of times. This technique of sequential dissociation is referred to in the art as $MS^n$ analysis. Unlike prior techniques, the unique "select and store" feature of the present invention enables a highly sensitive $MS^n$ method to be carried out in which the isolation/fragmentation sequence for a particular sampled ion may be extended by additional steps to obtain more structural information of sampled ions or in which individual constituents of a mixture may be efficiently and cost effectively analyzed. The advantages of $MS^n$ techniques, especially the additional information available to the analyst, and the various strategies that may be employed in interpreting results have been described in the literature. For example, dissociation of an ion fragment can produce new types of product ions that may not be observable in single-stage MS (metastable or CID) analyses. In addition, specific structural features such as linkage types may be identified by the hierarchy of ion fragmentation, particularly when such identification is difficult to achieve by measurement of mass alone (e.g., for isobaric ion fragments).

While the particular strategy to be employed depends on the type of sample being analyzed, techniques for analyzing data and arriving at useful results are within the skill of the ordinary artisan. Guidance may also be had by referring to recent publications in this field. For example, Ngoka and Gross in J Am Soc Mass Spectrom 1999, 10, 732–746 describe strategies for $MS^n$ analysis of cyclic peptides. Lin and Glish in Analytical Chemistry, Vol 70, No. 24, Dec. 15, 1998 disclose techniques for C-terminal peptide sequencing via multistage ($MS^n$) mass spectrometry. Also, the role of $MS^n$ in the analysis of carbohydrates, and the strategies for interpreting results, is described by Solouki et al. in Analytical Chemistry, Vol. 70, No. 5, Mar. 1, 1998. Each of these foregoing references is incorporated by reference herein.

Figure 3A:
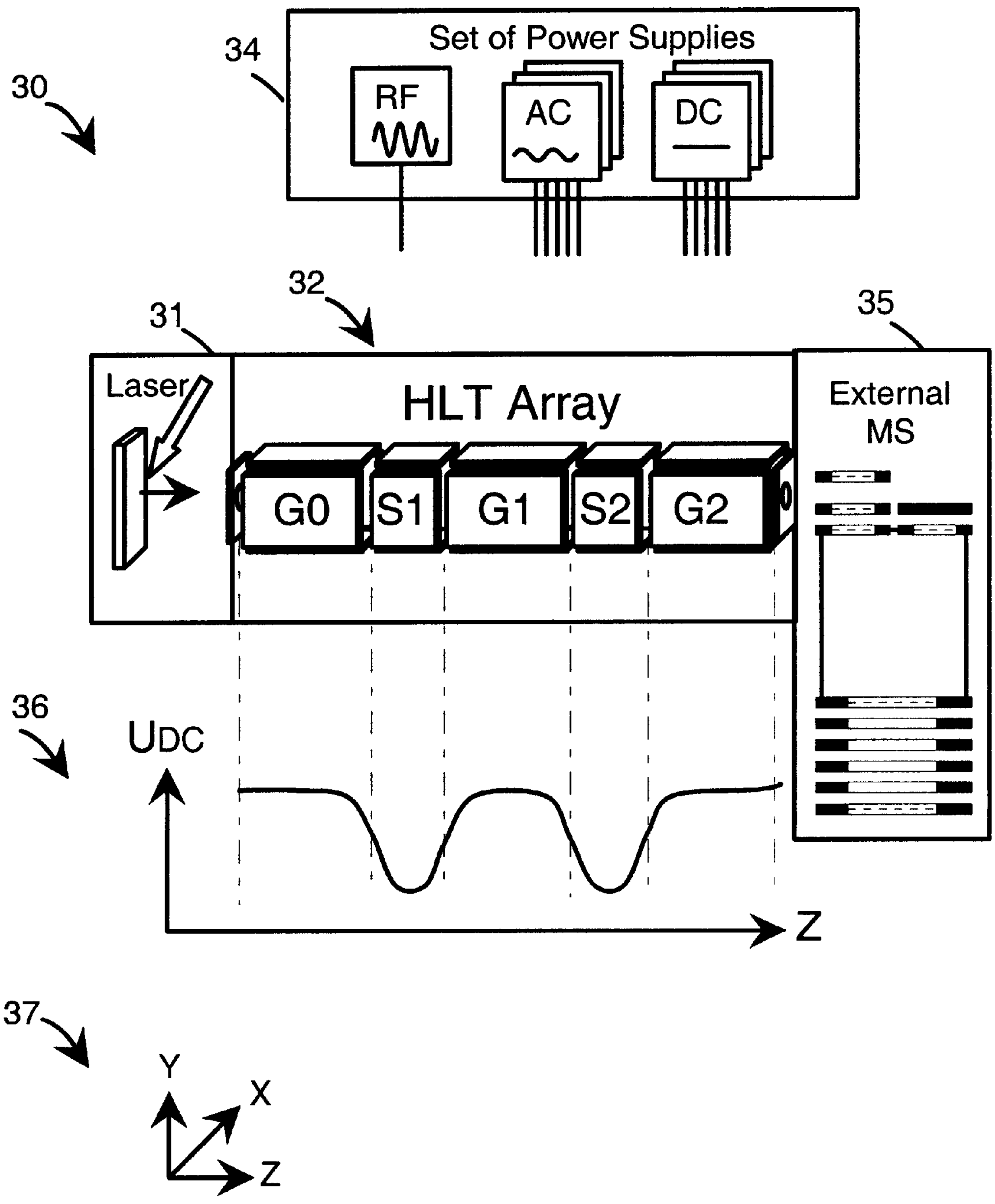
FIG. 3A is a schematic diagram of one preferred embodiment of the invention.

Referring to FIG. 3A, one preferred embodiment of an $MS^n$ mass spectrometer 30 of the present invention is as a linear array of harmonic linear traps (HLTs). The embodiment includes a pulsed ion source, 31 a linear array of HLT ion traps, composed of a plurality of communicating open parallelepiped cells 32, a vacuum housing 33, a set of power supplies 34 and an external mass spectrometer 35. The parallelepiped cells of the HLT array are composed of separate rectangular electrodes oriented in ZX and ZY planes with no plates in the XY plane, i.e. the Z-faces are omitted. As shown the guarding cells have a greater length along the z axis than the storing cells. This configuration optimizes performance relative to the cubic cell shown in FIG. 1, for example, by creating a dipolar field for z excitation with a reduced radial component and by increasing the z oscillation frequency for a given DC voltage on the guard cell. Both factors contribute to higher resolution in mass-selective transfer. The first trap of the array is in communication with the pulsed ion source 31 and the last trap with the mass spectrometer 35. The HLT array is enclosed in the vacuum housing 33 at an intermediate or variable vacuum, separated from the vacuum chamber of ion source 31 and mass spectrometer 35. The pressure in the HLT array is sustained by a vacuum pump and gas inlet (not shown). Power supplies of the set 34 are electrically connected to individual square electrodes of the array. A single frequency RF voltage is applied in phase to the top and bottom plates (X plates) of each cell and $\pi$ out of phase to the front and back plates (Y plates) of each cell with an RF frequency in the range from 300 kHz to 3 MHz and an amplitude of 1 to 10 kV. The same DC voltage is applied to the four electrodes of an individual cell. The DC voltage is separately established for each cell and is varied during the ion transfer steps. Typical DC voltages are in the range from 10 to 300V. The AC voltage is applied between pairs of adjacent cells with frequencies in the range of 10 KHz to 1 MHz and amplitude of 1 to 30V. The voltage sources are decoupled from one another using capacitors, floated transformers and inductive coils and similar schemes well known in the art (see FIG. 3C).

Figure 3B:
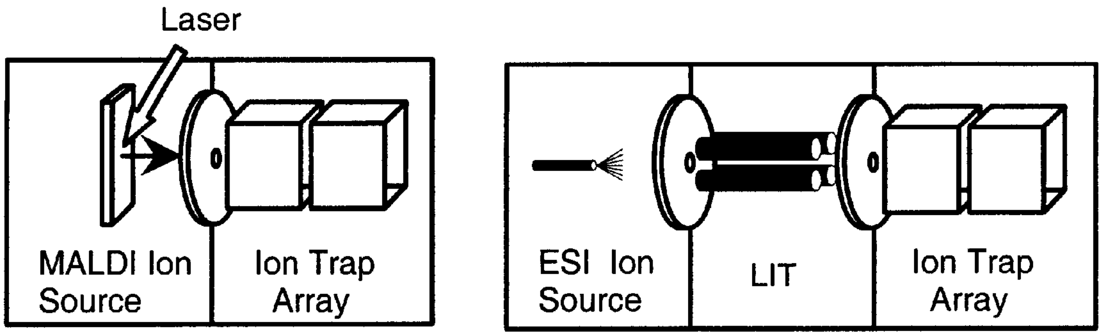
FIG. 3B is a schematic diagram of two different ion sources useful with the embodiment of FIG. 3A.
Figure 3C:
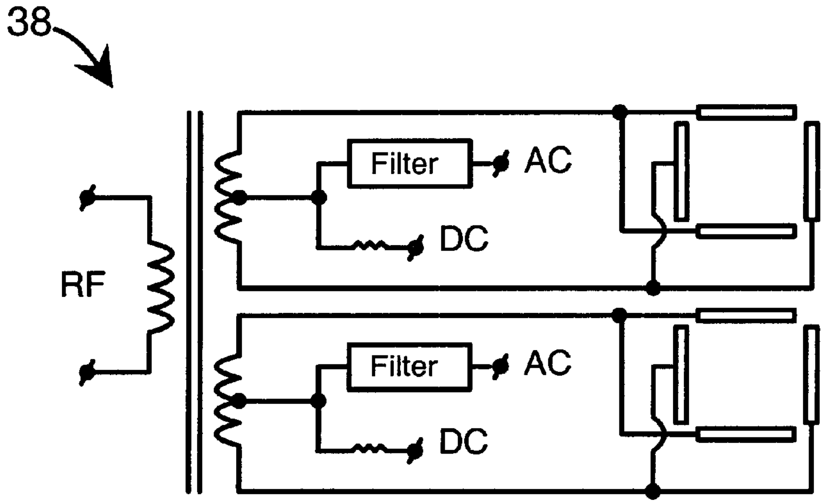
FIG. 3C is a schematic diagram showing the application of applied voltages useful with embodiment of FIG. 3A.

As further shown in FIG. 3B, the HLT array can serve as an interface between either electrospray or MALDI ionization source and a high resolution mass spectrometer such as a TOF, FT-ICR or Paul trap mass spectrometer.

The configuration of each HLT has the novel property of trapping ions while allowing (locally) harmonic oscillations in the axial (z) direction. The RF voltage creates an axially uniform RF field that provides radial confinement of ions. The DC potentials are applied to all four electrodes of each individual cell. As seen from the potential energy diagram $U_{DC}$ in FIG. 3A, the cells with a local minimum of DC potential are the storing cells (denoted as S1, S2) while cells with a local maximum of DC potential are the guarding cells (denoted as G0, G1,G2). Both cell triplets (G0, S1, G1) and (G1, S2, G2) create HLTs, hence FIG. 3A illustrates an array of two HLTs. Because of collisional cooling in rarefied gas the ions lose their kinetic energy and are confined to the center of the storing cells, as long as the ion's internal energy does not exceed the fragmentation threshold and the kinetic energy of the height of the DC barrier. In the case of using a slowly pulsing ESI source, with ~1 sec switching time, the storing capacity of the first cell may be insufficient. Then, a long multipole guide at intermediate pressure is used as a buffer. Non-selective transport of ions between cells is accomplished by reducing the DC potential of the target (acceptor) cell below the potential of the donor cells and by lowering the potential of the guarding cells in-between. The cumulative gradient of DC fields applied to the different cells could be used for continuous flow of ions through the HLT array.

The HLT array device of this embodiment provides highly sensitive $MS^n$ analysis, using the strategy of branched MS/MS analysis. The individual steps of selective and non-selective transfer, fragmentation and collisional damping are described below.

Selective sampling of ions of interest is done in a two-step process. In a first step a resonant AC signal is applied in a dipolar mode between a trapping cell and a guard cell on either side of the trapping cell. This is used to excite axial oscillations of the ions of interest. In the HLT the axial (z) component of the trapping field is a pure electrostatic field with a parabolic profile near the origin. Thus, the period of the ion's axial oscillations near the origin is proportional to the square root of mass/charge ratio, so that the frequency of the applied AC signal directly corresponds to the mass/charge ratio of selectively excited ions. In the second step the potential of the guard cell immediately downstream is rapidly lowered after a predetermined number of excitation cycles. The number of cycles depends on the efficiency of resonant excitation. In one example, the number of cycles was estimated by numerical simulation within realistic instrument geometry and operating parameters, and found to be about 100 z-oscillation cycles over a period of about 2 ms. This estimation can be later refined as part of an instrument tuning procedure. Only the resonantly excited ions have the proper z oscillation amplitude and phase to cross over the lowered barrier and into the next storing cell. Trapping of ions in the acceptor cell is assisted either by collisions with gas at a higher gas pressure or by dynamic trapping, i.e., a rapid reassertion of the guard cell potential after the selected ions have crossed the barrier.

In one preferred embodiment the dipolar AC is not a single frequency waveform but a time dependent frequency waveform (such as a nonlinear chirp). The electrostatic axial field is parabolic only in a neighborhood of the origin and as the ions are excited away from the origin by the dipolar field their z oscillation resonance frequency changes with amplitude. Applying a near harmonic waveform that shifts frequency in concert with the an harmonic oscillations of the driven ions improves the m/z selectivity of the ion transfer. The non-selective transfer is made by lowering the DC barrier between adjacent cells and by setting the DC potential of the ion donor cell higher than the DC potential of the ion acceptor cell.

In one preferred embodiment the steps of ion fragmentation are also implemented by dipolar excitation of the axial (z) coordinate, only without the lowering of the guard cell potential. The axial ion motion remains strongly confined by the static DC field irrespective of the m/z shift going from the parent ion to the fragment ions. The radial coordinates are governed by Mathieu stability and the ion fragments must have stable trajectories to be trapped. However, in contrast to the Paul trap, the Mathieu-governed (radial) coordinates are not directly driven and their amplitude remains small.

In one preferred embodiment fragmentation is accomplished by raising the DC potential difference between donor and acceptor cells above a threshold level of ~40V per 1 kD of ions mass. The sampled ions are accelerated between cells and experience energetic collisions with gas molecules in the acceptor cell. The kinetic energy is transferred into internal energy and ions are trapped and produce fragment ions that have even lower kinetic energy and are trapped as well.

Each step of transfer or fragmentation is usually followed by a collisional damping of fragment ions. Ion damping, i.e., confinement near the ion trap origin is necessary for the subsequent step of selective sampling. In one mode of operation the gas pressure in the ion trap array is held constant at the $10^{-5}$ torr level. Such pressure is sufficiently low to avoid collisional damping at a sampling step, and takes about 1 ms in time. However, collisional cooling at such a low gas pressure would take at least 10 to 100-fold longer time, which would slow down a multistep branched analysis. For example, a 50 step analysis would take up to 5 sec. To accelerate the $MS^n$ analysis the gas can be introduced in short pulses, such that the gas pressure is higher during ion dampening and the gas is evacuated during selective sampling steps. The gas pulses can be also introduced during the ion fragmentation step without affecting fragmentation process.

Figure 4A:
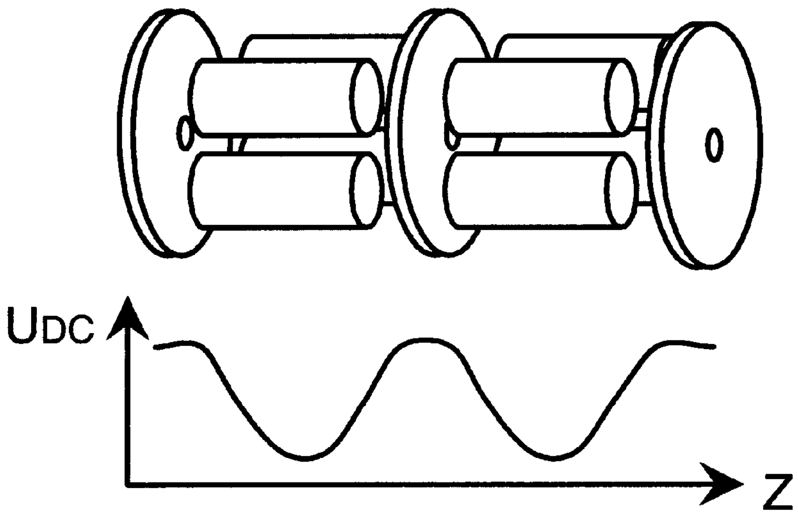
FIGS. 4A and 4B are schematic diagrams of other embodiments with a higher resolution of ion selection.
Figure 4B:
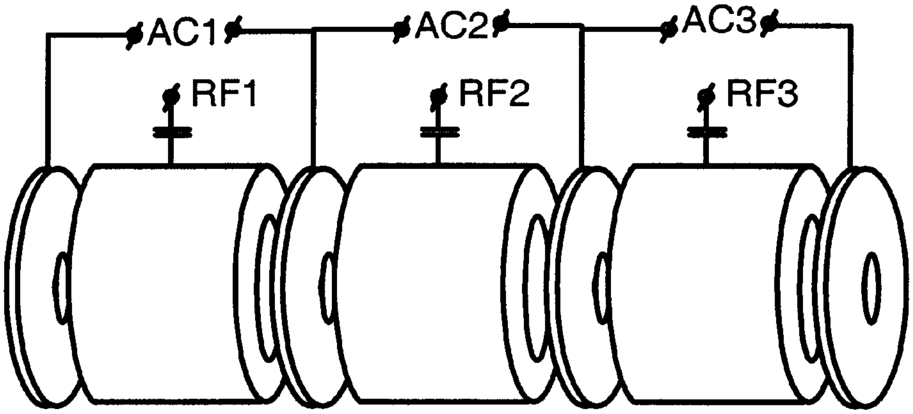

When higher resolution of selective sampling is desired, an array of traps can be composed using alternative types of traps, such as RF-only quadrupole traps (FIG. 4A) and Paul traps (FIG. 4B).

Referring to FIG. 4A, the ion trap array is composed of RF-only quadrupole traps. Each trap includes a storing cell made out of 4 cylindrical rods (quadrupole) surrounded by two plate electrodes. The plates are shared between adjacent traps. A higher DC voltage on the guarding plates provides a static barrier, which normally retains ions within the storing quadrupole cells. The RF signal is applied between pairs of quadrupole rods creating a quadrupolar field. The AC signal is applied between quadrupole rods either in quadrupolar or a dipolar mode.

In operation, the steps of ion non-selective transfer, fragmentation and dampening are made exactly as was described above for HLT traps. The step of selective ion transfer is carried out in a way unique for RF-only quadrupole traps. The principal difference is defined by the type of field at the boundaries of the RF-only quadrupole. Contrary to HLT, the RF field is no longer uniform along the z-axis. The RF field diminishes in the vicinity of the guarding plates. As a result, the gradient of the RF field forces certain ions out of the quadrupole, while the DC barrier retains the other ions within the quadrupole trap. The gradient of the RF and AC fields causes coupling between radial and axial motion. Ions of interest are selectively excited either by the RF field or by an additional AC signal, gain kinetic energy, penetrate through the DC barrier and get transferred to an adjacent trap. Selective ejection out of RF-only quadrupole is described in experimental studies of Hager, J., reported in Rapid Communications in Mass Spectrometry, 13, 740–748 (1999) whose disclosure is hereby incorporated by reference. The device is known to produce a low energy ion beam and provide high-mass resolution of ion ejection. Typically, the RF and AC amplitudes are ramped up and ions are ejected in sequence of m/z values, with light ions being ejected first. This limits flexibility in choosing the order of ion selective sampling, but still allows multiple strategies of the branched $MS^n$ analysis. A higher flexibility is achieved by applying a frequency adjusted AC signal. Ions of specific m/z are selectively excited radially and gain a higher kinetic energy. Due to the above mentioned coupling between radial and axial motions, the axial kinetic energy of ions is increased and ions get transferred through the DC barrier.

Since resolution of ion selection is improved compared to open cubic cells, it is expected that the specificity of the $MS^n$ result and information content could be high even without an external mass spectrometer. The last cell itself is used for mass analysis. A separate RF voltage can be applied to the last cell for a rapid resonant ejection of ions onto a time resolving detector, similar to the RF-only quadrupole or the Paul ion trap techniques. The separate RF voltage can also improve the resolution of selective sampling. Since all the described processes are occurring sequentially in time, an "analytical" grade RF power supply could be connected to the cell requiring mass analysis, while the rest of the cells are connected to a storing RF power supply.

Referring to FIG. 4B, one preferred embodiment of a tandem mass spectrometer of the present invention is as a linear array of Paul traps. As was described previously, conventional Paul traps are capable of trapping and collisionally cooling ions, selectively sampling and fragmenting ions moving ions between cells and ejecting them into an external detector or mass spectrometer. By using an array of traps the use of a Paul trap is extended for selective transfer between traps. Thus, this type of array can also be used in practicing the present method of sample and store $MS^n$ analysis with storage of intermediate ions and analysis of fragmentation channels.

In order to create an array of Paul traps the conventional geometry of curved electrodes of the Paul trap is altered. Here the traps are realized by a cylinder with two coaxial flat rings, serving as cap electrodes, as has been described by Kornienko et al. in Rapid Commun. Mass Spectrom. 13, 50–53 (1999) whose disclosure is hereby incorporated by reference. Two ring electrodes could be used to further approximate the cylinder as has been described by Ji, Davenport and Enke. in J Am Soc Mass Spectrom 1996 7, 1009–1017 whose disclosure is hereby incorporated by reference. An RF signal is applied to the cylinder while the DC potential is applied to the flat rings. A higher frequency and lower amplitude RF field signal is used to facilitate a sufficiently soft ion ejection/sampling. In this embodiment the flat ring cap electrodes serve as guard cells and the barrier between the Paul traps is an effective potential (often described as a pseudopotential well depth) and not simply an electrostatic barrier reflecting the DC applied to the cap. These traps have an open design, compared to conventional Paul traps that facilitates ion exchange between cells. Paul traps are known to provide storing and collisional cooling of ions. Ions can be selectively moved between traps by dipolar excitation (AC) at the resonant frequency of ion z motion in the trap ("resonant ejection"). Here the dipolar AC is applied to the coaxial flat rings surrounding the cylindrical electrode.

The external mass spectrometer used with the embodiments described can be any kind of high resolution MS with parallel ions detection, including high resolution Paul ion trap, FT-ICR, TOF MS and TOF-MS with orthogonal injection (o-TOF MS). The TOF MS is a particularly attractive detector, providing instant detection of all ion fragments and thus enabling rapid characterization of multiple fragmentation channels in the array.

Figure 5A:
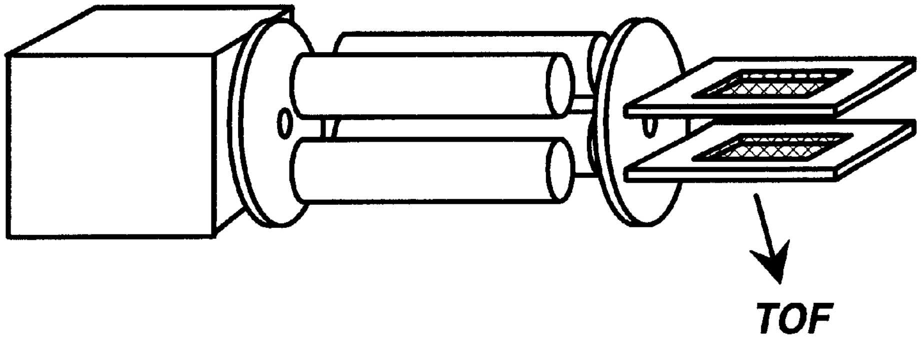
FIGS. 5A–5C are schematic diagrams showing various schemes of coupling of the linear array of ion traps of the embodiment of FIG. 1 to a time-of-flight mass spectrometer.
Figure 5B:
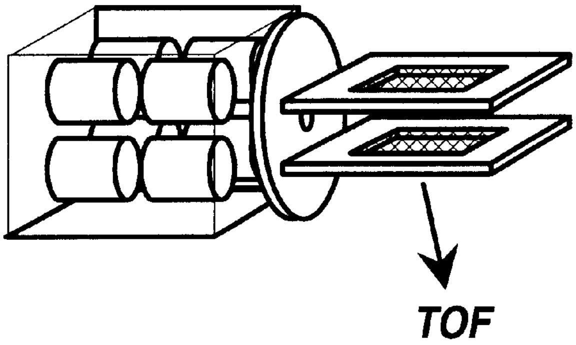
Figure 5C:
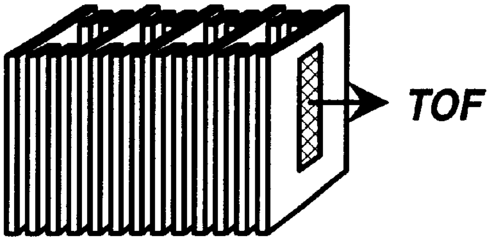

Referring to FIGS. 5A–C, ions produced in the trap array are injected into an external TOF MS using the following alternative schemes:

a) Ions are injected into the o-TOFMS via a multipole ion guide with collisional cooling (FIG. 5A), b) Ions are collisionally cooled in a specialized trapping cell and then ions are pulsed injected into synchronously pulsing acceleration stage of the o-TOFMS (FIG. 5B), c) Ions are collisionally cooled in the last cell of the linear array of traps at a low gas pressure (below 1 mtorr) and then ions are pulsed out of the cell directly into an axial TOF MS (FIG. 5C).

Scheme (a) utilizes a quadrupole ion guide to relax kinetic and internal energy of ions ejected out of the trap array and to confine the beam to the axis. Currently all commercial o-TOF MS utilize an ion guide with collisional cooling. The quadrupole ion guide is known to form a perfect ion beam for the consequent analysis in o-TOF MS. The disadvantage of the scheme is a moderate efficiency (10–20%) in utilizing a continuous beam. The problem is known in the art as a duty-cycle losses in orthogonal TOF. Only 10–20% of ions are inside the orthogonal pulsing region at the time of the pulse, the rest of the ion beam is not used.

Scheme (b) utilizes a specialized, generally asymmetric HLT instead of the quadrupole ion guide. Using collisional cooling the ion beam's kinetic energy is decreased and is confined to the axis of the last cell. The packet of ions is pulsed injected into the orthogonal acceleration stage of o-TOF MS. Here the objective is ion packet compression and optimal transfer to the orthogonal acceleration stage of o-TOF MS. The ion packet is shorter than the orthogonal pulsing region (typically 1 to 2") and with proper synchronization the entire ion beam can be used in the o-TOF MS. The scheme improves sensitivity of the method and allows keeping the HLT and TOF MS in separate differentially pumped chambers. While the optimum pressure in the trap is around 1 mtorr, the gas pressure in the TOF analyzer has to be in a low $10^{-6}$ torr range or lower.

Scheme (c) eliminates an extra step, compared to scheme (b). Ions are directly pulsed out of the last trapping stage of the linear array of traps after collisional cooling. A preferred method involves pulsing out of a planar segmented trap (FIG. 5C) at a low gas pressure. The scheme ensures desired initial conditions of the beam at the time of the pulse. In one particular instance the gas is introduced by a pulsed valve at the time of the fragmentation and cooling steps, and the gas is pumped down at the time the TOF pulse is applied. In another particular case the ions are injected into the final cell located in the subsequent pumping stage and operated at a lower, sub-millitorr gas pressure.

Having described preferred embodiments and some examples of combining useful elements, it will now become apparent of skilled in the art that other embodiments incorporating the concepts may be used. It is felt, therefore, that this embodiment should not be limited to disclosed embodiments, but rather should be limited only by the spirit and the scope of the following claims.

What is claimed is:

1. An apparatus for conducting multiple step mass spectrometric analysis comprising:

a pulsed ion source for producing an ion packet;

a plurality of interconnected ion traps comprising one or more cells, a first one of the traps receiving the ion packet;

a power supply connected to each of the cells for generating and applying RF, AC and DC signals to each cell such that an RF field is created within, and variable DC and AC potentials are applied to, each of the cells;

means for adjusting the RF, AC or DC signals to provide for selective sampling of ions of interest in the first one of the traps, transport of the ions of interest to one or more adjacent traps and fragmentation of the ions of interest, while permitting the non-selected ions to be stored in at least one of the traps; and a detector for analyzing the ion content of at least one trap.

2. The apparatus of claim 1 wherein the mass spectrum of detected ions is acquired by sequential resonance ejection of ions into an ion detector.

3. The apparatus of claim 1 wherein the detector is a mass spectrometer selected from the group consisting of time-of-flight, ion trap, Fourier transform and magnetic sector mass spectrometers.

4. The apparatus of claim 3 wherein ions to be detected are continuously injected into a multipole guide of an orthogonal TOF MS.

5. The apparatus of claim 3 wherein ions to be detected are pulse ejected from a last cell into an orthogonal or axial TOF MS.

6. The apparatus of claim 1 wherein the plurality of interconnected ion traps is a linear array of harmonic linear traps (HLT).

7. The apparatus of claim 6 wherein the RF field in the array of HLT is uniform in the axial (z) direction, and each HLT comprising a storing cell interspersed between a pair of guarding cells.

8. The apparatus of claim 7 wherein each of the storing and guarding cells is a parallelpiped without a face in the axial direction of ion transport.

9. The apparatus of claim 7 wherein each of the storing and guarding cells are segments of a hollow cylinder.

10. The apparatus of claim 7 wherein each of the storing and guarding cells is a set of quadrupoles.

11. The apparatus of claim 1 wherein the plurality of interconnected ion traps is a linear array of Paul traps.

12. The apparatus of claim 11 each Paul trap comprises a storing cell interspersed between a pair of guarding cells.

13. The apparatus of claim 1 wherein the ion trap comprises an RF-only quadrupole configured to store ions.

14. The apparatus of claim 1 wherein ion fragmentation is induced by resonant AC excitation.

15. The apparatus of claim 1 wherein ion fragmentation is induced by acceleration of ions by DC bias between adjacent ion traps in which ions are stored.

16. The apparatus of claim 1 wherein a gas is introduced into the cell via a pulsed valve at the time of collisional cooling of ions between stages of selection, excitation and analysis.

17. The apparatus of claim 1 wherein the cells of the ion trap comprise a storing cell interspersed between a pair of guarding cells and wherein mass spectrum of detected ions is acquired by determining the frequency of ion z-axis motion by sensing the induced signal between storing and guarding cells.

18. A method of conducting multiple step mass spectrometric analysis comprising the steps of:

introducing an ion packet from a pulsed ion source to at least one of a plurality of interconnected ion traps;

selectively sampling and transporting ions of interest from the at least one trap to one or more adjacent traps while continuing to store non-selected ions in at least one trap;

fragmenting the ions of interest within the at least one ion trap; and detecting the ions in the at least one trap.

19. The method of claim 18 wherein detection is performed by a mass spectrometer selected from the group consisting of time-of-flight, ion trap, Fourier transform and magnetic sector mass spectrometers.

20. The method of claim 18 wherein the ion traps comprise one or more cells including a triplet sequence of a storing cell separated by a pair of guarding cells.

21. The method of claim 18 wherein the plurality of interconnected ion traps is a linear array of harmonic linear traps (HLT) and wherein ions are transported between adjacent HLT by selectively exciting ions of a predetermined mass to charge ratio to create axial (z) motion by applying a resonant frequency AC field between a storing cell and adjacent guarding cells of the HLT and by lowering the DC potential on one of the adjacent guarding cells after a predetermined excitation period.

22. The method of claim 21 wherein an AC field is applied between a storing cell and adjacent guarding cells of the HLT that shifts in frequency during the excitation period in a manner that reflects the amplitude-dependent change in z oscillation frequency of the ion and wherein the DC potential on one of the adjacent guarding cells is lowered after a predetermined excitation period.

23. The method of claim 21 wherein ions are sampled out of the HLT by applying an AC excitation signal along the z axis and by dynamically adjusting the DC potential on one of the adjacent guarding cells.

24. A method of conducting multiple step mass spectrometric analysis comprising the steps of:

(a) selectively sampling and transporting ions of interest from a first ion trap cell to an adjacent ion trap cells while continuing to store all non-selected ions in the first cell;

(b) fragmenting the ions of interest within the adjacent ion trap cell;

(c) emptying the contents of the adjacent ion trap cell into a detector; and (d) repeating steps (a)–(c) one or more times.

* * * * *